(12) United States Patent
Boult et al.

(10) Patent No.: US 8,838,990 B2
(45) Date of Patent: Sep. 16, 2014

(54) BIO-CRYPTOGRAPHY: SECURE CRYPTOGRAPHIC PROTOCOLS WITH BIPARTITE BIOTOKENS

(75) Inventors: Terrance E. Boult, Monument, CO (US); Walter Scheirer, Colorado Springs, CO (US)

(73) Assignee: University of Colorado Board of Regents, Denver, CO (US)

( * ) Notice: Subject to any disclaimer, the term of this patent is extended or adjusted under 35 U.S.C. 154(b) by 1199 days.

(21) Appl. No.: 12/315,014

(22) Filed: Nov. 26, 2008

(65) Prior Publication Data

US 2009/0271634 A1     Oct. 29, 2009

Related U.S. Application Data

(60) Provisional application No. 61/125,502, filed on Apr. 25, 2008.

(51) Int. Cl.
| | |
|---|---|
| *G06F 21/00* | (2013.01) |
| *H04L 9/32* | (2006.01) |
| *G06F 21/32* | (2013.01) |
| *G06F 21/33* | (2013.01) |
| *G06K 9/00* | (2006.01) |
| *H04L 9/08* | (2006.01) |
| *G07C 9/00* | (2006.01) |

(52) U.S. Cl.
CPC .......... *H04L 9/3231* (2013.01); *G07C 9/00158* (2013.01); *G06F 21/32* (2013.01); *G06F 21/335* (2013.01); *G06K 9/00885* (2013.01); *H04L 9/0866* (2013.01); *H04L 9/0877* (2013.01); *H04L 9/0894* (2013.01)
USPC .................................. 713/186; 726/9; 726/20

(58) Field of Classification Search
None
See application file for complete search history.

(56) References Cited

U.S. PATENT DOCUMENTS

| | | | | |
|---|---|---|---|---|
| 7,178,025 | B2 * | 2/2007 | Scheidt et al. | 713/168 |
| 7,590,861 | B2 * | 9/2009 | Abdallah et al. | 713/186 |
| 2001/0039619 | A1 * | 11/2001 | Lapere et al. | 713/186 |
| 2002/0176583 | A1 * | 11/2002 | Buttiker | 380/282 |

* cited by examiner

*Primary Examiner* — Kaveh Abrishamkar
(74) *Attorney, Agent, or Firm* — Dale B Halling

(57) ABSTRACT

Techniques, systems and methods are described relating to combining biometric and cryptographic techniques to support securely embedding data within a token and subsequent biometrically-enabled recovery of said data. Various transformation approaches are described that provide a secure means for transforming a stored or live, secure biometric-based identity token, embedding data into such tokens and biometric-based matching to both verify the user's identity and recover the embedded data. Security enhancements to a range of existing protocols are described using the techniques. Systems using novel protocols based on these techniques are described.

20 Claims, 6 Drawing Sheets

US 8,838,990 B2

BIO-CRYPTOGRAPHY: SECURE CRYPTOGRAPHIC PROTOCOLS WITH BIPARTITE BIOTOKENS

CROSS-REFERENCE TO RELATED APPLICATIONS

The present invention claims priority on provisional patent application, Ser. No. 60/858,140, filed on Nov. 27, 2007, entitled "Bidirectional Transactional Biotoken" and priority on provisional patent application, Ser. No. 61/125,502, filed on Apr. 25, 2005 entitled "Bio-Cryptography: Secure Cryptographic Protocols with Bipartite Biotokens" and is are hereby incorporated by reference.

STATEMENT REGARDING FEDERALLY SPONSORED RESEARCH OR DEVELOPMENT

This invention was made with partial support from the National Science Foundation STTR program under Grant No OII-0611283.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

THE NAMES OF THE PARTIES TO A JOINT RESEARCH AGREEMENT

Not Applicable

REFERENCE TO SEQUENCE LISTING, TABLE, OR COMPUTER PROGRAM LISTING

Not Applicable

TECHNICAL FIELD

Embodiments of the present invention generally relate to biometric signatures and cryptographic key management for secure communication, logical and physical access. More specifically, embodiments of the present invention provide means for securely embedding a key or data within a biometric, and extracting that same key on later embedding of the correct biometric.

BACKGROUND ART

Secure systems require identification/authentication of users and protection of keys/passwords used for encryption of data. Prior art, related to the current invention falls into three categories: biometric feature extraction/recording, protecting biometric data, and combining biometrics and key embedding.

Biometrics generally are methods of identifying or verifying the identity of a person based on a physiological characteristic, with the constraint that the characteristics are relatively unique to an individual and do not change significantly over time. There is a plethora of prior art describing feature extraction, recording, and use of biometric parameters unrelated to the secure storage of such biometric parameters or key management. Examples of the features measured are: face, fingerprints, hand geometry, palm prints, iris, retina, vein, and voice. To be most effective, features to be measured should be distinctive between people and have a sufficient level of invariance over the lifetime of the person. Biometric technologies are becoming the foundation of an extensive array of highly secure identification and personal verification solutions. Because our invention is concerned with the secure mixing of biometrics and keys, and largely independent of the details of how the biometric parameters are acquired, details of this category of prior art are omitted By definition, physical biometrics are not changeable, and must be protected because they present serious security risks if they are compromised. "Biometric authentication system with encrypted models" (U.S. Pat. No. 6,317,834), discuses the risks and teaches an approach of encrypting and decrypting biometrics. The encryption can be further enhanced, as taught by "Biometrics template" (U.S. Pat. No. 7,302,583) by splitting the key, using key-shares. Traditional encryption approaches, including '834 and '583, provide only limited protection for stored biometrics because the stored data must be decrypted for each use, so the keys are available to both parties when used. More generally the asymmetric and non-revocable nature of biometrics, even with encryption, presents other issues for both privacy and security concerns. In particular, one party, say Alice, has the store of biometric data for matching and must protect that data store. The other, say Bob, has a live sample for verification. Either Bob can send his raw "live" biometric data to Alice and trust she will protect the data and is the proper source for matching and must trust her stated results. Alternatively, Alice can send the matching data to Bob (e.g. for a match-on-card biometric to protect privacy) and then trust the result when Bob says it matches or not. Either way, one side must place considerable trust in the other, for both matching "results" and for protection of the privacy/security of the data, including encryption/decryption keys. This directly limits the trust some organizations or people will place in biometric solutions. It also limits remote authentication, e.g. web-based biometric authentication, where a "man-in-the-middle" could capture the biometric data and any keys. In summary, to safely transmit, or store, biometrics requires pre-shared keys for encryption and trusting the other party with the keys and biometric data.

An alternative approach to protecting biometric data is to transform the data into some form of revocable token, where unlike the unique characteristics of biometrics, the user can have multiple different revocable biometrically-derived identity tokens. Multiple versions of biometric-based identity tokens have been developed including "System and method for distorting a biometric for transactions with enhanced security and privacy" (U.S. Pat. No. 6,836,554 B1). This patent teaches of using non-invertible distortions to protect data. It is worth noting that the conversion of the original biometric sample into any standard biometric template is formally non-invertible, as data is lost, yet the need to protect the template motivates their work. What matters is not formal mathematical non-invertiblity of the transform, but the level of effort needed to recover an approximate representation that effectively matches the original data. The function $Y=X^2$ is not invertible, but given Y only takes 2 guess to find X. Their general approach, based solely on non-invertible distortions, does not provide sufficient protection of the underlying biometric data to be considered secure. No detailed of actual secure transforms are presented.

Another approach in the prior art is the extraction of a small number of unique bits from the biometric data, which is then combined with cryptographic data to provide a key that depends on both the biometric and cryptographic data. Such an invention is discussed in "Biometric certificates" (U.S. Pat. No. 6,310,966) and in "Generating user-dependent keys and random numbers" (U.S. Pat. No. 6,687,375). These patents teach ways of using n bits of data obtained from a biometric to mix with a cryptographic key. The basic concept is obvious, but how to obtain n bits that are both stable and relatively unique are not and the patents do not present processes to reliably obtain that stable n-bit input. The issue of finding stable subsets of data, with the addition of error correction, is discussed in "Biometric based user authentication with syndrome codes" US Patent Application 20060123239 and Biometric Based User Authentication and Data Encryption (US Patent Application 20070174633). In these works, syndrome codes based on Wyner-Ziv or Slepian-Wolf coding are used represent biometric data, with the claim that it can then be stored securely, while still tolerating the inherent variability of biometric data. Essentially, the security of the syndrome encoding is due to the fact that it is a compressed version of the original biometric parameter. In a similar manner, "Biometric template protection and feature handling", (US Application 2007/0180261 A1), teaches of an approach to protection using quantization and so-called helper data to produce a token that can be revoked. An important problem with the approaches of '966, '375, '239 and '261 is these classes of solutions predetermine the level of quantization of the data and hence cannot reasonably vary the False Accept Rate (FAR) or False Reject Rate (FRR) after the generation of the biometric-based identity tokens, hence they are predetermining the tradeoff between security and ease of use. Furthermore, none of these approaches discuss the actual FAR/FRR achievable by the systems, and if the systems have a higher FAR rate, then their security can be effectively compromised as an attacker can use a data store of existing biometric data to search for a existing biometric sample that will match the stored "protected" biometric-based identity token, effectively finding an approximate inverse.

The final area of related work is in protection of keys/passwords using biometrics. As secure systems often depend on keys for protection of data, providing a means to authenticate who has access to those keys is an important part of those systems. These systems mix the key and the biometric data with the goal of simultaneously protecting both. There are two important families of works in this area, generally referred to as "Fuzzy vaults" or "Fuzzy Commitment" and Biometric Encryption. Fuzzy Vaults are described in "A Fuzzy Vault Scheme," by Juels, A., Sudan, M., in Proceedings of the 2002 IEEE International Symposium on Information Theory, June 2002; Juels and Wattenberg, "A fuzzy commitment scheme," in Proc. of the 5th ACM Conf. on Comp. and Comm. Security, New York, N.Y., pgs. 28-36, 1999; U.S. patent application Ser. No. 09/994,476, "Order invariant fuzzy commitment system," filed Nov. 26, 2001; with more recent work in S. Yang and I. M. Verbauwhede, "Secure fuzzy vault based fingerprint verification system," in Asilomar Conf. on Signals, Systems, and Comp., vol. 1, pp. 577-581, November 2004. U. Uludag and A. Jain, "Fuzzy fingerprint vault," in Proc. Workshop: Biometrics: Challenges arising from theory to practice, pp. 13-16, August 2004 and "Multi-biometric Template Security Using Fuzzy Vault," by K. Nandakumar and A. K. Jain, Proc. of the IEEE Conf on Biometrics: Theory, Applications, and Systems (BTAS 2008), The technique called Biometric encryption, is described in "Fingerprint controlled public key cryptographic system" (U.S. Pat. No. 5,541,994), "Method and apparatus for securely handling a personal identification number or cryptographic key using biometric techniques" (U.S. Pat. No. 5,712,912), and "Method for secure key management using a biometric", (U.S. Pat. No. 6,219,794). Both Fuzzy Vaults and Biometric Encryption methods bind a key to biometric data so that the key is released only after matching with the biometrics. These approaches differ in how they bind the data to biometrics, but both families of algorithms are subject to multiple attacks to compromise the embedded keys. In "Cracking Fuzzy Vaults and Biometric Encryption", in the Proc. 2007 IEEE Biometric Symposium, Scheirer and Boult present three attacks against these algorithms. The Attack via Record Multiplicity (ARM) shows that if an attacker can gain access to two or more instances of the "secure" tokens, these tokens can be combined to recover the underlying key and the underlying biometric data. The second attack, Serendipitous Key Inversion (SKI) shows how knowledge of the key that is released constrains the underlying biometric data—which means that whoever gets access to the released key, including the system owners, can recover most of the biometric data. Nandakumar and. Jain 2008, the authors concede that the fuzzy vault "is not a perfect template protection scheme" because of these attacks. Other, brute-force oriented, attacks against fuzzy vaults have included CRC checks ("The Fuzzy Vault for Fingerprints is Vulnerable to Brute Force Attack, P. Mihailescu. Online at http://arxiv.org/abs/0708.2974v1, 2007) and chaff point identification ("Finding the Original Point Set Hidden Among Chaff, by W. Chang, R. Shen and F. W. Teo, In *Proc. of the ACM Symposium on Information, Computer And Communications Security,* 2006). Other successful attacks against biometric encryption include hill climbing attacks ("Vulnerabilities in Biometric Encryption Systems", by Andy Adler in IAPR Audio and Video-Based Biometric Person Authentication, 2005). These attacks render these two classes of systems unacceptably insecure. A final problem with these approaches is that, like 966, '375, '554, '239 and '261 discussed above, they are non-invertible and can only be generated from the raw biometric—meaning that if compromised or if the user wants to change the key, they must physically reenroll. This means that they cannot be varied on a per-transaction basis. If captured via Phising or a compromise of the data store, they can be used to attack the original system. Furthermore, a system operator is less likely to inform users and incur the costs of reenrollment of all users, unless there is definitive evidence of a security breach.

In summary, the prior art provides a base for biometric-based security technologies and key management but is lacking in the important respects of protecting the biometric data and the embedded keys. It is also lacking in operational situations because of the need to have users reenroll to issue new biometric-based identity tokens or embed new keys.

DISCLOSURE OF INVENTION

Brief Summary of the Invention

The present invention is a system and method for combining biometric and cryptographic techniques to provide identity tokens with embedded data. In particular the method improves security by providing the ability to transform biometric data into a stored revocable identity token, which is unique per transaction, and to embed different data or keys into that token on each transaction. This provides an improved solution for a range of applications including cryptographic key management, network transactions, digital signatures, document verification and user authentication.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION AND MODES FOR CARRYING OUT THE INVENTION

Figure 1:
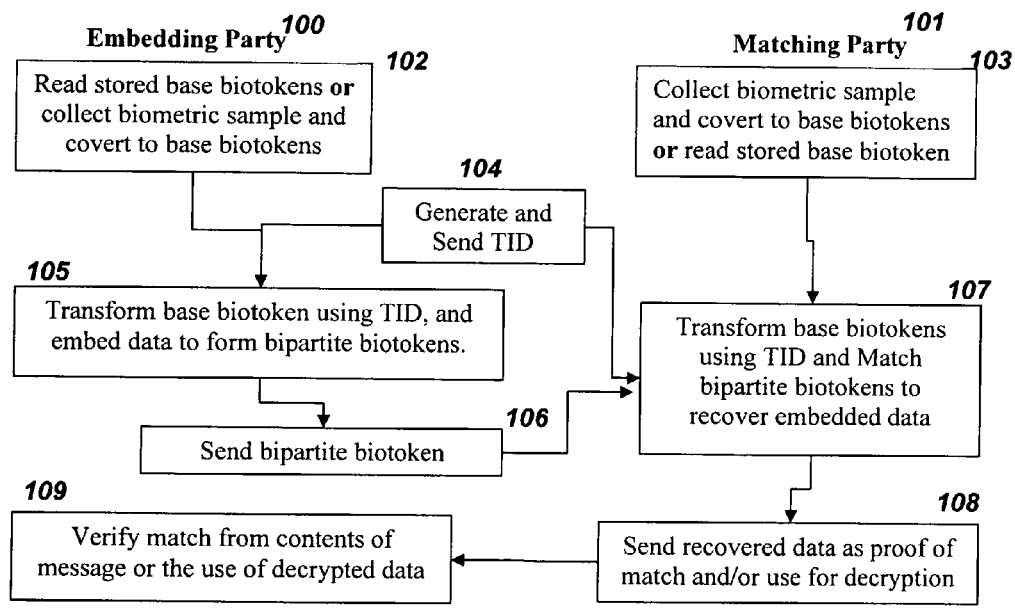
FIG. 1 is a flow chart conceptually illustrating the steps in one embodiment of a bipartite biotoken.

Techniques, systems and methods for biometric-based tokens with embedded data, which are unique pre-transaction and protect the embedded key. Broadly stated, embodiments of the present invention utilize a multi-stage transform to embed a key or nonce within a biometric signature such that later matching, with robust distance metrics, against different biometric samples provide means for recovering the embedded key. The transforms and the keys can be unique per transaction.

Revocable biotokens have emerged as an effective solution to the template protection problem and are described in "Revocable biometrics with robust distance metrics, PCT/US 2005/037490, and T. Boult, W. Scheirer and R. Woodworth, "Secure Revocable Finger Biotokens," In *Proc. of the IEEE Conf. on Computer Vision and Pattern Recognition*, 2007, and "Robust Distance Measures for Face Recognition Supporting Revocable Biometric Tokens," by T. Boult, in *In Proc. of the 7th IEEE International Conference on Automatic face and gesture recognition*, Southampton, UK, 2006. All three of these are incorporated herein by reference. We briefly summarize the concept, which we refer to herein as biotokens, as the preferred embodiment of the current invention builds from that secure template protection of biotokens. For any biometric data that can be split into stable and unstable components, the stable portion can be encrypted in a reliable fashion, while the unstable portion is left in the clear. The aforementioned references provide for the definition of a biotoken transform for user j each field f in a biometric template, $v(f,j)$ wherein the transform scales/translates the data, e.g. $v'(f,j)=s(f,j)*v(f,j)+t(f,j)$, and then separates $v'(f,j)$ into a quotient, $q(f,j)$, and modulus or remainder, $r(f,j)$, where $q(f,j)$ is stable, i.e. does not vary even when the base biometric data undergoes natural variations. Since $q(f,j)$ is stable, it can be encrypted or hashed, to form, $w(f,j)$. The encrypting/hash can use public key cryptography, cryptographic hashing and can incorporate company-specific keys and a user-specific passphrase. Given a probe with encoded fields $w_p$ and $r_p$, and a gallery entry with fields $w_g(f,j)$ and $r_g(f,j)$, the biotokens transform induces a robust distance measure, per feature, in encoded space. For example, if $w_g(f,j)==w_p(f,j)$ then distance $d=\min((r_g(f,j)-r_p(f,j))^2, c)$ else $d=c$. A discussion of parameters and a proof that these privacy enhancements do not decrease, but may increase, the accuracy of the recognition system is given in Boult 2006. An initial biometric sample is transformed, field by field, into an overall secure revocable biotoken B. The same encoding process, with the same pubic keys and potentially user-specific pass-codes, is applied for both the probe and gallery yielding $B_p$ and $B_g$, respectively. For comparing two biotokens, the overall similarity/distance is computed as a combination of the per-field distance over all fields, in the same manner they were combined before the transform. The process of generating a biotoken allows nesting, where the residuals $r(f,j)$, are passed through each nesting level without change, but the encoded fields $w(f,j)$ can be subject to a additional layers of encrypting/hashing with added transform/encryption parameters e1, e2, each being applied to the previous result, yielding $w_{e1}(w(f,j))$, $w_{e2}(w_{e1}(w(f,j)))$, etc. These multiple nested transforms can be applied over each field of the secure revocable biotokens B, resulting in multiple biotoken instances, $B,B_1,B_2$ derived from the same sample.

The core of our bio-cryptographic key management is an extension to the revocable biotoken to provide bipartite match confirmation with data embedding. The underlying mechanism is a mixture of the biotoken matching and securing process combined with polynomial-based shared secrets and hashes for validation. This approach addresses more significant privacy and security issues than biotokens alone and completely prevents replay, phishing and man-in-the middle attacks; no non-public transmitted data is ever reused. While any encryption/hashing process can be used for general biotokens, the preferred embodiment for this invention uses public key cryptography so the nesting process can be formally invertible as long as the private key associated with the first stage of encoding is available. With this nesting in mind, we can define three properties for the bipartite biotoken:

1. Let B be a secure biotoken. A bipartite biotokens BB is a transformation of the kth instance of user j's secure biotokens B. This transformation supports matching in encoded space of a bipartite biotoken instance BB(j,k) with any secure biotoken instance BB(j,p) for the biometric features of a user j and a common series of transforms $e_1, e_2, \ldots, e_n$
2. The bipartite biotoken transformation must allow the embedding of some data D into BB(j,k) represented as BB(j,k;D)
3. The matching of BB(j,K;D) and BB(i,p) for some users i and j must release D if i and j are the same users and if the biotokens are using the same application keys a common series of transforms $e_1, e_2, \ldots, e_n$ and pass-codes, otherwise it should return an error code or a random string as the recovered data.

Bipartite biotokens are similar in spirit to digital signatures and certificates—the approach allows both parties to mutually validate the transaction. The data transmitted in a bipartite biotoken addresses privacy, secure matching and non-repudiation. We first describe the general process and then a more detailed discussion of the preferred embodiment using fingerprints. An overview of one embodiment of the basic process is described in FIG. 1. A overview of one embodiment of the basic process is described in FIG. 1. The process includes one party doing the embedding (100) and one that will be doing the matching (101). These describe roles, not people, e.g. it is possible these are the same individual at different points in time. The embedding party will then read either a stored biotoken, or compute a new base biotoken from a biometric sample (102), and the matching party also obtains its base biotoken (103). Either or both parties may used stored or live data to generate their base biotoken. One party generates a Transaction TID and sends it to the other (104), with the particular protocol for an application determining which party would initiate the transaction and generate the TID. The message may also include public key information associated with the biotokens, or those keys could be stored locally. The embedding party would take the TID and its base biotoken (102), use the TID to transform the base biotoken to make it unique to this transaction and would also embed the data into it to from the bipartite biotoken (105), and then send/store the bipartite party to the matching party (106). The "sending" could include storing the bipartite biotoken which is retrieved by the matching party at a later time, e.g. storing the embedded encryption key into a bipartite biotoken that is then stored on a USB stick. The matching party would transform its base biotoken using the TID and use the transformed biotoken to match the bipartite biotoken from the embedding party, with matching process recovering the embedded data (107). Depending on the protocol being used, the matching party would then either send the recovered data back to the embedding party, or use the embedded data as a key to encrypt or decrypt data (108). The final, step, which is optional, the embedding party can verify that the match was successful by either matching the data returned in the message (108) matches the data it embedded, or by observing activities that prove the matching party was able to encrypt/decrypt data using the embedded key (109). This approach completely prevents phishing and man-in-the middle attacks as no transmitted data is ever reused except the public-key. If needed for fraud protection, the process can transmit/store an added encryption key in the bipartite biotoken to privacy protect the original biometric image data for eventual use in fraud prosecution, which increases the deterrent for attempted fraud, thus improving security.

Figure 2:
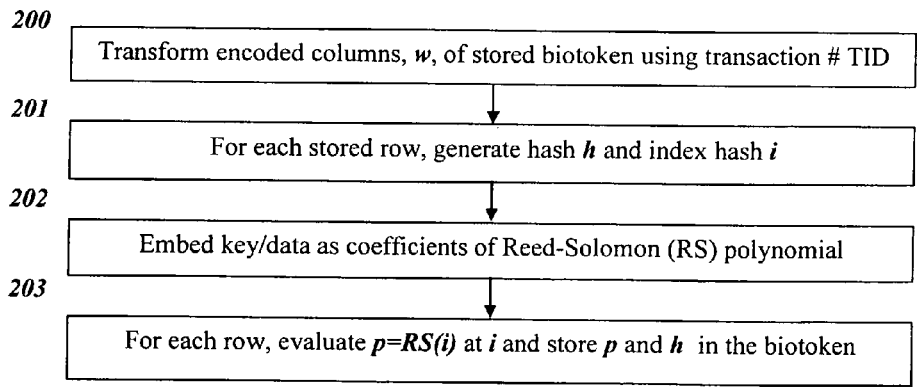
FIG. 2 illustrates a flow chart of the stages of encoding the embedded key into a biotoken.

One of the fundamental security flaws in the fuzzy vault family and biometric encryption approaches is that they store raw data and associate it with the stored key. Thus an attacker that can gain access to multiple records, or who has access to the key, has sufficient information in the multiple related items of data that allow them to recover the remaining data. Many embodiments of the present invention improve the security by removing this direct connection. In particular, the embedded data is not related directly to the stored data. Rather the stored data is transformed and hashed, based on a transaction ID, and that transformed data is what is bound with the key. FIG. 2 shows the basic encoding/embedding process for an embodiment using a Reed Solomon Polynomial to encode the key. Each stored encoded field the encoded data, e.g. $w2 = w_{e2}(w_{e1}(w(f,j)))$, is transformed with the transaction ID id, for each row we generate a transaction specific encoded field (200), $h = w_{e3}(w2)$ as well as being transformed into a second transform/hash value (201) using $i = w_{id}(w2)$. Note that the stored value will be an already encoded value of $w2 = w_{e2}(w_{e1}(w(f,j)))$ thus this stage is just applying transforms to stored, and already protected, biotokens fields. Note that the hashed values, h, from one biotoken can be used, in the nesting sense discussed above, as the encoded value for another round of encoding. While logically interchangeable, we use different symbols w and h to help the reader separate the different roles, the encoded/protected values in an base biotoken, and the hashed values in a bipartite biotoken.

In an embodiment using a polynomial for embedding the data, we then evaluate the polynomial encoding D at p=RS(i; D) (202). Alternative embodiments may use some function of i rather than directly using i. The resulting values p and h are stored for this particular row and the overall encoded bipartite biotoken is obtained by repeating this process foe each row of the data. During matching, both the client and server can recreate i' during the encoding/decoding process, and thus have access to it, but an attacker does not have access to it. If an attacker has access to the key or to multiple records they cannot use them to recover the underlying data as each of the records/keys is based on different evaluation points. After transforming the whole biotoken, B, the result is a vector of evaluation point I. An important element of the present invention is that the point of evaluation, I, is not stored or transmitted.

Figure 3:
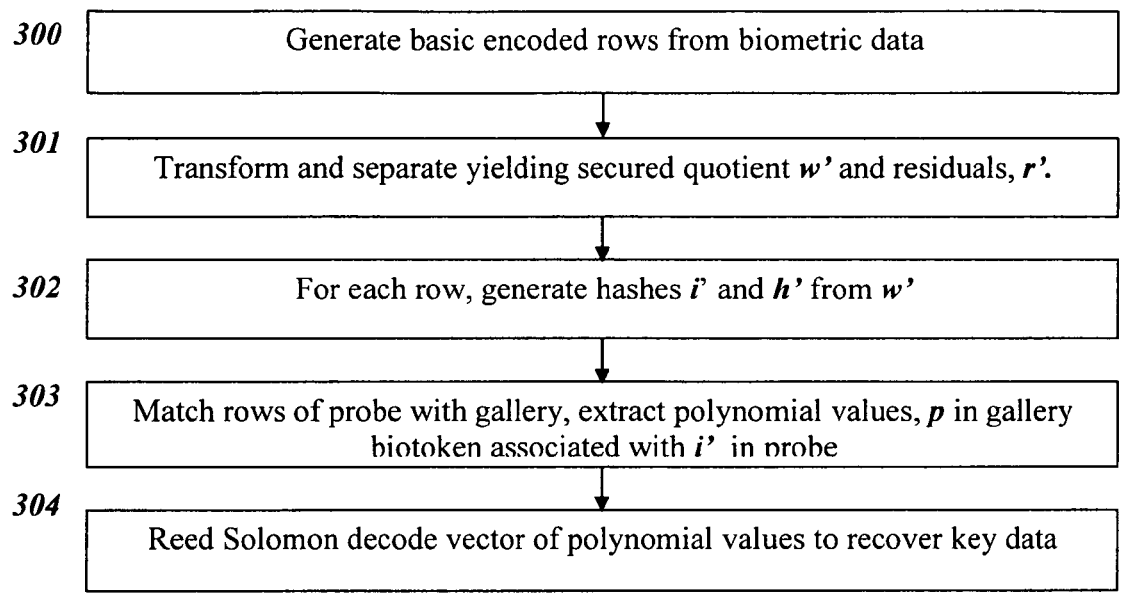
FIG. 3 illustrates a flow chart of the stages of decoding the embedded key from a bipartite biotoken.

For the decoding process, described in FIG. 3, the system first generates the basic encoded data from the raw data (300) and separates it into the residual r, and encoded component. $w_{e2}(w_{e1}(w(f,j)))$ (301). It then (302) generates $h' = w_{e3}(w_{e2}(w_{e1}(w(f,j))))$, as well as the second transform/hash value $i' = w_{id}(w_{e2}(w_{e1}(w(f,j))))$. For the probe the result is a vector $I_p$ and for the gallery $I_g$, but with sufficient overlap between the probe and gallery there will be sufficient shared evaluation points for recovery of the polynomial. To do this the system will match the probe and gallery (303), which is a process that will depend on the particular biometric being used. Given the matching identifies the matching rows of the probe and gallery the system can identify the evaluated polynomial data p from the gallery data which is associated with i' in the probe. Collecting all such associations the system then has sufficient data to do the polynomial decode (304) and recover the embedded data/key. Since the biometric matching is only approximate there is still the potential for accidental matching and errors, which is why in the preferred embodiment the polynomial representing the key should including a level of error correction consistent with the expected errors for that particular biometric modality and matching process.

The above describes a general embodiment which can be applied across a wide range of biometric modalities. Biotokens have been deployed, with significant performance evaluation for face and fingerprints, two very widely used biometric modalities. Extending these implementations to bipartite biotokens directly follows the process detailed above. Those skilled in the art will see how biotokens can be generated from voice, palm, finger geometry and any other biometric that represents its data a collection of fields to be matched.

Figure 4:
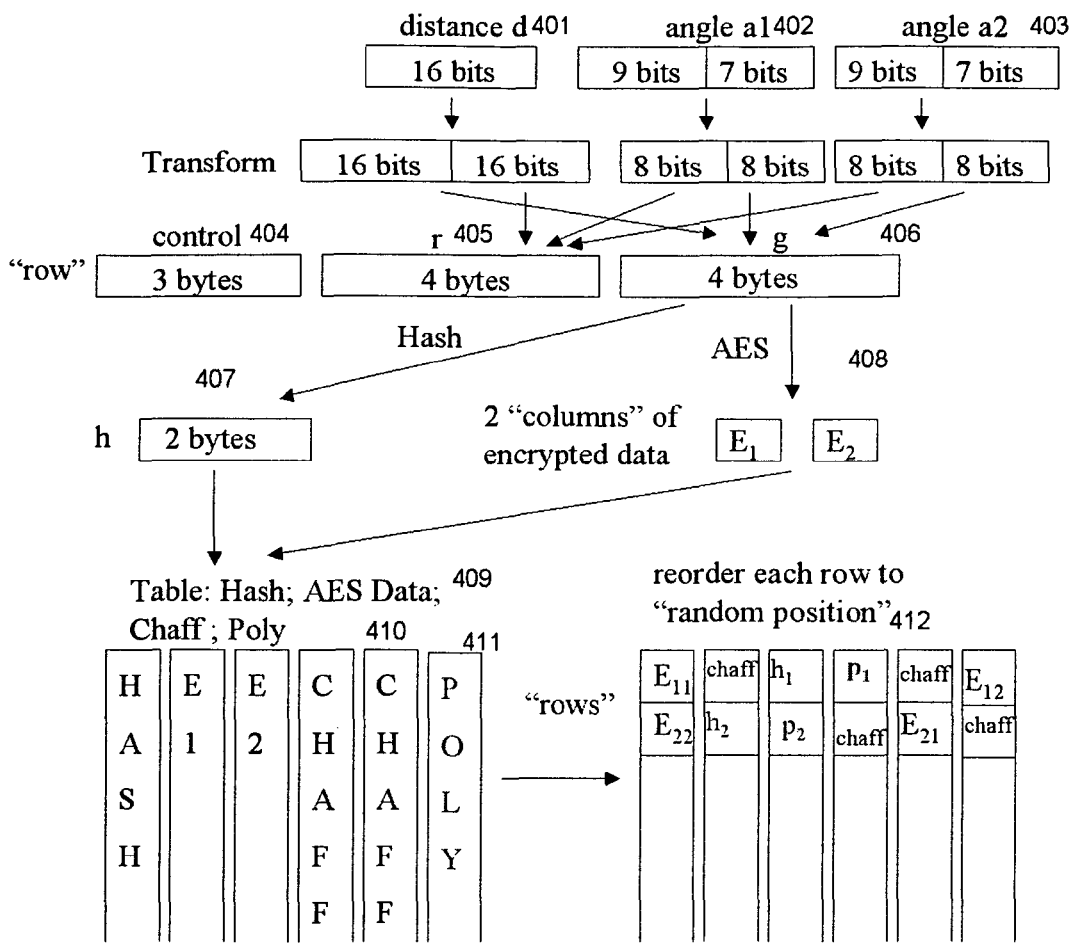
FIG. 4 illustrates the process of generating a fingerprint biotoken with embedded data.

FIG. 4 shows a diagram with a more detailed description of the process for fingerprint biotoken encoding where we illustrate added protection needed for smaller bit fields. In our case we need to protect the data and be able to identify the polynomial coefficients. While PKI encryption may be computational intractable to invert, if the data encoded is a small finite field, say a 10, 16 or even 32 bit number, it is quite practical to try encoding all possible inputs and seeing if they match. When addressing this issue with traditional encryption, the data is padded with random data, before encoding, and the pad is then ignored after decoding. But in our case we don't decode the data for matching, and since the random data would be mixed with the field of interest, even the encrypted padded field could not be matched unless the same pad was used for the test image and enrollment, which would then mean if it was compromised, it could be used for a brute force attack. We will now briefly describe the general concept using an example embodiment based on the implementation of the Bozorth-based public key biotokens described in Boult et al 2007. The natural form the matcher takes as input is a minutiae file with x,y,t,q, where x,y is the location, t the angle of the minutia in the image and q the minutiae quality. The fingerprint bipartite matching algorithm is comprised of three major steps:

Step 1 Encode: (FIG. 4) Construct intra-fingerprint minutia pair comparison tables for probe fingerprint and one table for each gallery fingerprint to be matched against. The minutia-pair contain, for each pair in the input, the distance d (401) and angle a1 (402) and a2 (403) which are each 16 bit numbers. There are also 3 bytes of "control" information (404) which we do not encode. We transform each of these into the generalized quotients qd, qa1, qa2 and their residuals rd, ra1, ra2. We collect into a single 32-bit number all the residual (405) and all the generalized quotients (406). In the preferred embodiment we encode the generalized quotients as both a hash value (407) and we also AES encrypt all the generalized coefficients (408) to permit recovery later. In an alternative embodiment we can AES encrypt the raw minutiae values. (We use the term hash as general concept. Any "checksum", including cryptographic checksums such as MD5 or SHA1, could be used. For many embodiments a traditional CRC, rather than a cryptographic checksum will be sufficient since detection of changes of an individual field is neither an issue nor a significant privacy risk. A single overall cryptographic checksum can be used to protect fields from tampering. In one embodiment we encode the checksum of the stored biotokens as an embedded key to protect the stored data from tampering.) The system collects all the data into a table of data, with one row for each pair of minutiae. (409). To further protect the data we can insert chaff columns (410) into the table. We also insert the polynomial that embeds the key as a column in the table. (411) To protect the data we shuffle each row, where during the reordering we store a known order of the data (modulo the number of columns), and place the evaluated polynomial in a known position relative to the encoded hash. (412). Note that in the shuffle, the control and residual data may be stored in a known position or stored relative to the hash. There is an implicit maximum embedding size in this approach based on the number of available rows. The total embedding capacity can be increased by splitting the key into multiple polynomials that are appended in order, e.g. h, p1, p2 . . . allowing much larger embedded data with the requirement of matching fewer rows.

Step 2 Match: Given a probe and a gallery, construct an inter-fingerprint pair-pair compatibility table, wherein the system compares a probe print's minutia pair comparison table to a gallery print's minutia pair comparison table and constructs a new pair-pair compatibility table. A row in the probe table is considered to match a probe in the gallery table if there is a corresponding hash (CRC) entry, if the residuals are within a matching tolerance. Given a set of potentially matching pairs, their minutiae indices (in the control data) and overall rotation is postulated and forms a link-table entry. The system then scans the inter-fingerprint pair-pair table traverse and link table entries into a web/forest of clusters that have consistent orientation and consistent endpoints when linked per cluster. The system then combines compatible clusters and accumulate a match score. As each cluster is formed it also develops a set of potentially matching values for i and p, the polynomial evolution points and the evaluated polynomial values.

Figure 5:
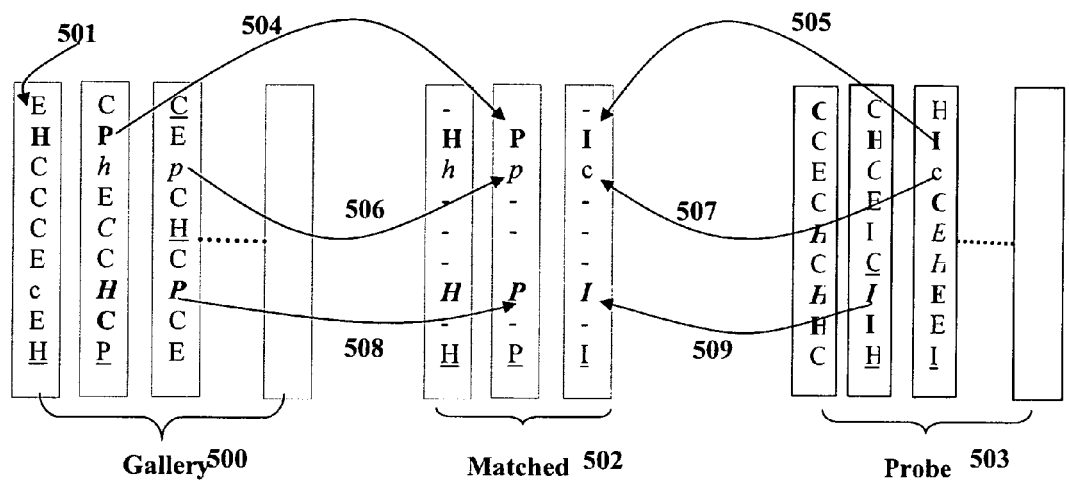
FIG. 5 illustrates the pair-row matching and recovery of non-stored hash values and embedded polynomial.

Step 3: Embedded Data Recovery. The preferred embodiment of the recovery step for fingerprints, FIG. 5, is a variation on the general process of FIG. 3. Because of the small field sizes, we do not evaluate a polynomial separately for each of the distance and angle fields. Rather for each row we extract the d, a1 and a2, and generate their stable hash h and, i and residuals. For the computing of i, the system uses a different hash of qd,qa1,qa2 than the one used to generate h. FIG. 5 illustrates the gallery table (500), generated from the stored biotoken and with the embedded polynomial. In the tables we have example data (501) were H or h is a stored hash value, p or P is a polynomial value, e/E is an encrypted value, c/C is chaff values and i/I is an index hash value. We use bold/italic/case to help show there are variations in the values for the different types of files for each row. The figure also illustrates the probe table (501) generated from the scanned biometric, with the index hash i, stored in the place of the polynomial p. It shows the collected data during matching (502). During the matching the associated values of the h are matched between the a row in the gallery table and the probe table, and verified with the residual data (not show) of that row. If the rows match, the known location of h allows the system to identify p in the gallery (504) and i in the probe table (505), and copy them into the matched table. If the row does not match, nothing is copied. Because these are small fields there is a change for an accidental match, which may identify a hash h and polynomial p (506) in the gallery and associate it with some other field such as chaff c (507). The process continues over all matching rows eventually building the match table with sufficient matched sets of the polynomial values P, and their associated evaluation index I. The system can then order the polynomial data based on I and reconstruct the underlying polynomial, generally including some level of error correcting, and recover the embedded key.

Figure 6:
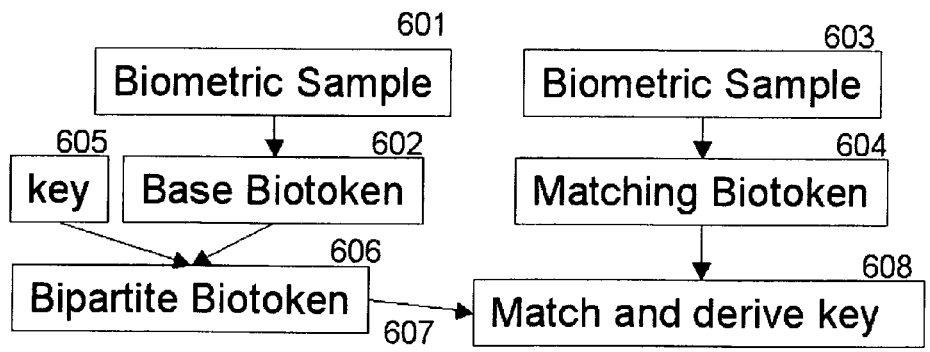
FIG. 6 is a flow chart of the critical components in generating/using a bipartite biotoken.

Having described a preferred embodiment for a particular biometrics, we return to summarize the overall key elements of the invention before discussing various embodiments in applications. FIG. 6 shows the most important elements, where a biometric sample (601) is used to generate a base biotoken. A biometric sample (603) is also used to derive the matching biotoken (604). As determined by the needs of the application, either or both of these biotokens might be stored in a server or computed from a live sample and can be from vary different times or locations. The base biotoken (602) is combined with a digital key (605) to form the bipartite biotoken. (606). This is transferred (607) to the matching unit where it is compared with the matching biotoken and the embedded key is derived (608). The transfer (607) could be via electronic communication or storage in some physical medium, e.g. a disk or 2D bar code. The applications can vary the content and use of the embedded key, which can be an encryption key, but it can also be a nonce, a password, a signature or any other piece of data that can be embedded.

In one embodiment of the invention, the concept of the non-stored evaluation points is generalized so that each row of the table contains multiple polynomials evaluated at points i1, i2, . . . , in This has the advantage of allowing larger embedded data sizes given a smaller number of matching rows. There are, of course, multiple variations on this idea that allow tradeoffs between storage size, computational cost and security. The preferred embodiment is described above, but the approach could be applied to any privacy preserving biometric, where the privacy-protecting biometric protects the actual biometric data and the embedded polynomial provides the mutual authentication. Those skilled in the art will see multiple embodiments combining the invention with previous work in privacy-enhanced biometrics and previous work in shared secrets.

Figure 7:
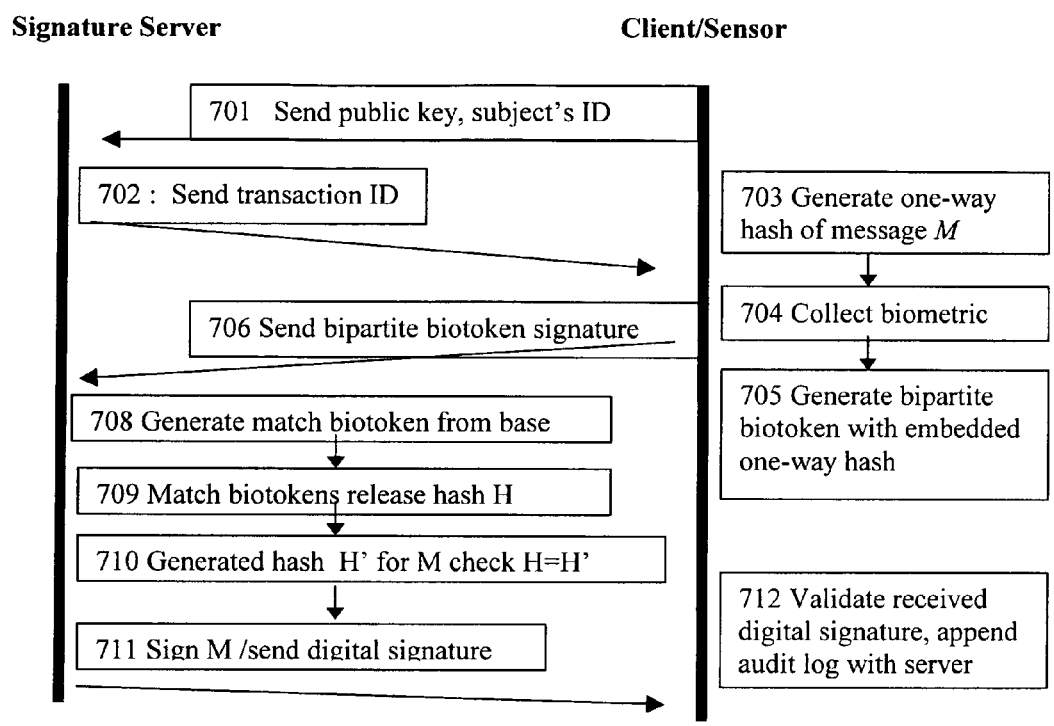
FIG. 7 is a flow chart of the stages an embodiment of bipartite biotokens for remote digital signature service.

Various embodiments of this invention allow solution to a range of applications and security problems. One embodiment uses the bipartite biotoken to solve the problem of secure login to a computer. In this embodiment, shown in FIG. 7, the data embedded in the bipartite biotoken is used in a remote digital signature server. As in the basic bipartite biotoken protocol, the sensor side first sends (701) a public key, and the subject's ID. The signature server responds with the transaction ID (702). The client/sensor side will generate a one-way hash H of a message M (703) that is to be signed, then collect the biometric (704), and generate a bipartite biotoken with H embedded within it (706). This biotoken is sent to the signature server (706) with the original message M. The signature server will generate a local bipartite biotoken from its base biotoken (708) for the user, and match the bipartite biotoken it receives (709). If the two biotokens match, the hash H for M is released. The server generates its own hash of M, and if that hash matches H (710), it concludes it's a valid request to sign. The signature server then signs (711) and sends a biotoken signature back to the sensor, where the signature is validated (712) and an audit log may be appended with server information. The use of a bipartite biotoken biometrically-validated signature server is a novel approach to increasing ease of use while also addressing the man-in-the-middle attack. Users no longer need a "secured physical token" for storing their private key, they can remotely access it for signatures wherever/whenever they need it. Formal digital signatures can even be added via an email-based implementation of the protocol. The bipartite biotoken secured hash ensures no man in the middle can modify the contents/hash before it is signed. Thus, in our protocol, a biotoken mis-match would force a termination of the transaction, as the invalid signature is immediately noted by the sensor side. Moreover, strong non-repudiation is introduced, allowing us to show that a message has been signed requiring the presentation of the users biometric data and associated biotoken keys. While mostly relegated to the traditional cryptography domain, digital signatures have emerged in the biometrics world over the past 10 years, for example C. Musgrave and R. Dulude, "System and Method for Authenticating Electronic Transactions Using Biometric Certificates," (U.S. Pat. No. 6,202,151), C. Musgrave and R. Dulude, "Biometric Certificates," (U.S. Pat. No. 6,310,966), and Account-Based Digital Signature (ABDS) System Using Biometrics," (US Patent Application 20070088950) all present schemes for digital signatures and transactional verification, using biometric data as some part of the process. Unlike the prior art, the bipartite biotoken approach for digital signatures does not depend on a device storing the biometric to protect the biometric data or the private key. For example in the '950 application, the recipient must trust that the senders device is not compromised because no biometric data is actually shared with the recipient, only a verification status. With the bipartite biotoken based approach both sides have actual confirmation of the match, not just a status field which could be easily generated by a compromised device.

Figure 8:
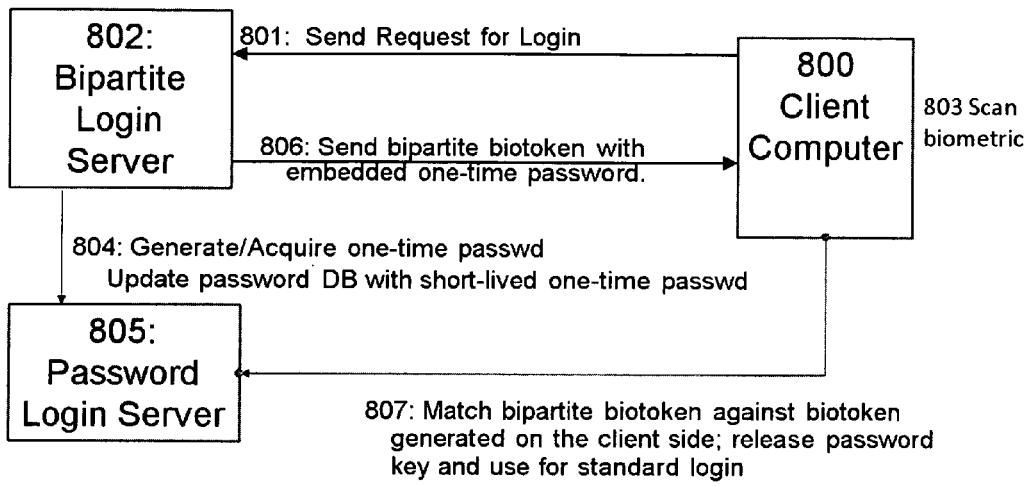
FIG. 8 is a flow chart of the stages an embodiment of bipartite biotokens for a computer login with a one-time password.

Another embodiment the bipartite biotoken's embedded data is used for computer login, as described in FIG. 8. In this embodiment, the client computer (800) sends a request for login (801) to the bipartite server (802). After the request, client also begins the biometric scan (803). The bipartite server (802) then generates a local random one-time use password or acquires it from a standard password generator and updates the password database (804) of the local password-based computer login system (805). The bipartite server embeds the one-time password as the data of the user's bipartite biotoken and sends (806) it back to the client. The client matches the received bipartite biotoken with the locally generated token and extracts the one time password which is used to login via the password-based login process (807). This bipartite biotoken is using its bio-cryptographic protocol to manage a one-time password. This is an example of an enhancement, in this case of the well known S-Key protocol. This increases system security as the password is strong and changes each time, but unlike S-Key it does not need to be remembered by or carried by the users. The password is very strong so it cannot be compromised in the short life time when it is valid. Unlike S-Key, only the authorized user can extract the password, via the bipartite biotoken matching.

Figure 9:
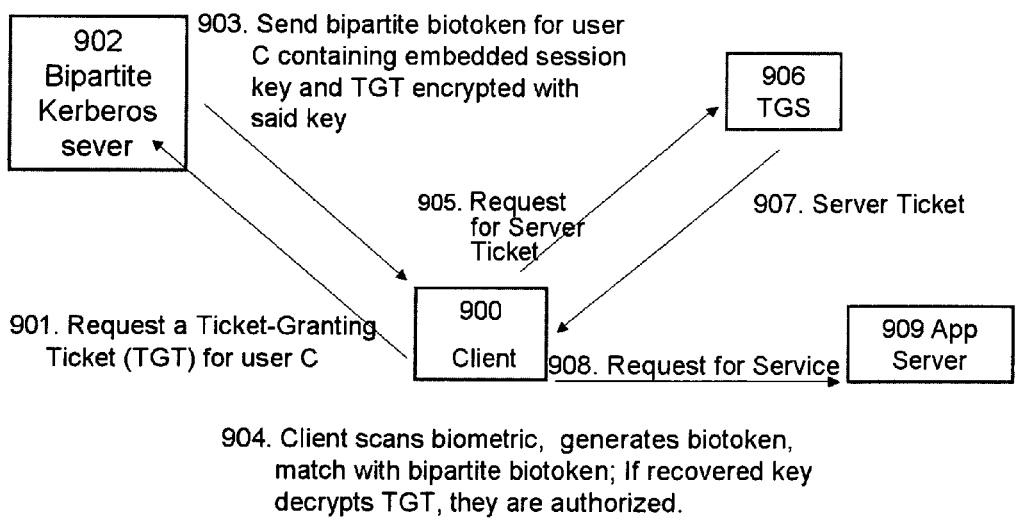
FIG. 9 is a flow chart of the stages an embodiment of bipartite biotokens for an enhanced Kerberos login

Another embodiment the bipartite bitoken's embedded data is used to enhance the standard Kerberos protocol used in my computer authentication schemes, as described in FIG. 9. Kerberos is a popular trusted third-party authentication protocol designed to grant access throughout a network, and is the most widely used network access authentication protocol. Kerberos avoids sending passwords between the client and server by using the user's password as an encryption key for the Kerberos "ticket". Several weaknesses exist in the Kerberos scheme and are well known to those skilled in the art. With the use of passwords as secret keys, it is possible for an attacker to collect messages and attempt to decrypt them with a simple password/dictionary brute-force attack. Because the user's password is used for the encryption, the attacker has a good chance of decrypting a ticket if he has access to a sufficiently large pool of tickets from different users, as some users inevitably choose weak passwords. Further, the notion of trust at the Kerberos server relies solely on stored secret keys to verify the identity of an authentication request. Verifying the authenticity of a client with such limited information is weak. In this embodiment of bipartite biotokens, the client (900) requests a ticket-granting ticket for login (901) from the bipartite Kerberos trusted third-party server (902). The server generates a session key for encryption of the remaining messages and embeds that in the bipartite biotokens sent (903) it to the client. The client then performs (904) the biometric scan, matching and release of the session key. The session key is then used in the remaining steps of the standard Kerberos protocol of sending the request for a server ticket (905) to the ticket granting server (906), who replies with the server ticket (907) which the client can then provide in a request for service (908) to any application server (910). This bipartite biotoken key management solves the well known problems with Kerberos. By using a random session key, embedded in the bipartite biotokens, it circumvents the problems of a dictionary attack and also improves non-repudiation. While the figure described one way of solving the issues, the embedded key could have just as easily been generated by the client and sent to the server, who could match and then use the key to encrypt the TGT. The critical elements here is that one party is generating a bipartite biotoken with the embedded key and the claimed identity of the client, and the other party, by matching it with a local biotoken can extract the key, and in doing so both parties have authenticated themselves because they have the proper access to the biometric data to manipulate the key. Establishing mutual trust via the bipartite biotoken authentication, is an important contribution of the present invention beyond the prior art.

With these example embodiments, those skilled in the art will see a range of embodiments where the bipartite biotoken's embedded data is used for data, secret or key management in a wide range of computer applications that previously used either shared secrets such as passwords or traditional biometrics. Using bipartite biotokens to store encryption keys could enable improved security at a lower cost for removable storage or data at rest applications. Embedding a key within a bipartite biotoken without a server, e.g. a bipartite biotoken printed as a 2D barcode, would enable verification of the owner of document/tickets without a centralized server. Other applications such as document verification, boarding passes, ticket verification, which are generally not verified, can be easily verified with this technology. The combined secure embedded data, extracted only via matching with data derived from the user's biometrics, has wide applications to improves security and privacy.

The invention claimed is:

1. A digital key embedding biometric-based authentication method for authenticating users, and/or authenticating data, and/or verifying the data/sender/receiver for a message and/or secure key transmission/storage, said digital key embedding biometric-based authentication method comprising the steps of:
   encoding a biometric data to form a biotoken, wherein the biotoken has a stable portion and an unstable portion, wherein the stable portion has a repeatable value;
   computing a bipartite biotoken by transforming the biotoken of a user, wherein the bipartite biotoken is a combination of the digital key and the biotoken;
   transferring the bipartite biotoken;
   receiving the transferred bipartite biotoken; and
   deriving the digital key from the bipartite biotoken and a matching biotoken associated with the user.

2. The method of claim 1, wherein the step of computing the bipartite biotoken is performed at a client where the user is located.

3. The method of claim 1, wherein the step of computing the bipartite biotoken is performed at a server.

4. The method of claim 3, wherein the biotoken is stored at the server where the user is enrolled.

5. The method of claim 4, wherein the biotoken is computed at a client by scanning the biometric.

6. The method of claim 5, wherein the biometric is not stored.

7. The method of claim 1, wherein the digital key is stored as the coefficients of a polynomial.

8. The method of claim 7, further including the step of:
   evaluating the polynomial at a plurality of locations derived from the biotoken;
   wherein the bipartite biotoken does not include the plurality of locations.

9. A digital key embedding biometric-based authentication method for authenticating users, and/or authenticating data, and/or verifying the data/sender/receiver for a message and/or secure key transmission/storage, said digital key embedding biometric-based authentication method comprising the steps of:
   receiving, at a first party, a bipartite biotoken from a second party and a claimed identity, wherein the bipartite biotoken is a combination of a key and a biotoken, wherein the biotoken has an encrypted portion and an unencrypted portion, wherein the encrypted portion is a repeatable value;
   determining, at the first party, if the key can be recovered from the bipartite biotoken using a matching biotoken associated with the claimed identity;
   when the key can be recovered from the bipartite biotoken using the matching biotoken associated with the claimed identity, authenticating both parties.

10. The method of claim 9, further including the steps of;
    transmitting the key to the second party;
    determining if the key from the first party is the same as a key generated at the second party;
    when the key from the first party is the same as the key generated at the second party, authenticating the first party.

11. The method of claim 9, wherein the second party generates a one time key and combines it with the biotoken to create the bipartite biotoken.

12. The method of claim 11, wherein the biotoken is created by encoding a biometric data of a user.

13. The method of claim 9, wherein the step of determining if the key can be recovered includes determining a plurality of coefficients of a polynomial.

14. The method of claim 11, wherein the step of generating the bipartite biotoken includes the step of hashing portions of the biotoken.

15. A digital key embedding biometric-based authentication method for authenticating users, and /or authenticating data, and/or verifying the data/sender/receiver for a message and/or secure key transmission/storage, said digital key embedding biometric-based authentication method comprising the steps of:
   transferring a transaction ID from an embedding party to a matching party;
   transforming a match biotoken using the transaction ID and an embed data to form a bipartite biotoken at the embedding party, wherein the match biotoken has a stable portion and an unstable portion;
   transferring the bipartite biotoken from the embedding party to the matching party;
   converting a biometric sample into a probe biotoken at the matching party;
   recovering the embedded data using the probe biotoken, the transaction ID and the bipartite biotoken at the matching party.

16. The method of claim 15, wherein the biometric sample includes at least one fingerprint.

17. The method of claim 15, wherein the biometric sample includes an image of part of a face.

18. The method of claim 15, wherein the step of transforming the match biotoken into the bipartite biotoken includes the step of storing the embedded data as coefficients of a polynomial.

19. The method of claim 18, further including the step of:
   evaluating the polynomial at a plurality of locations derived from the match biotoken;
   wherein the bipartite biotoken does not include the plurality of locations.

20. The method of claim 15, further including the step of:
   transferring the embedded data from the matching party to the embedding party.

* * * * *